(No Model.)
J. GULDEN.
VESSEL FOR HOLDING AND DISPENSING MUSTARD.
No. 243,884.  Patented July 5, 1881.
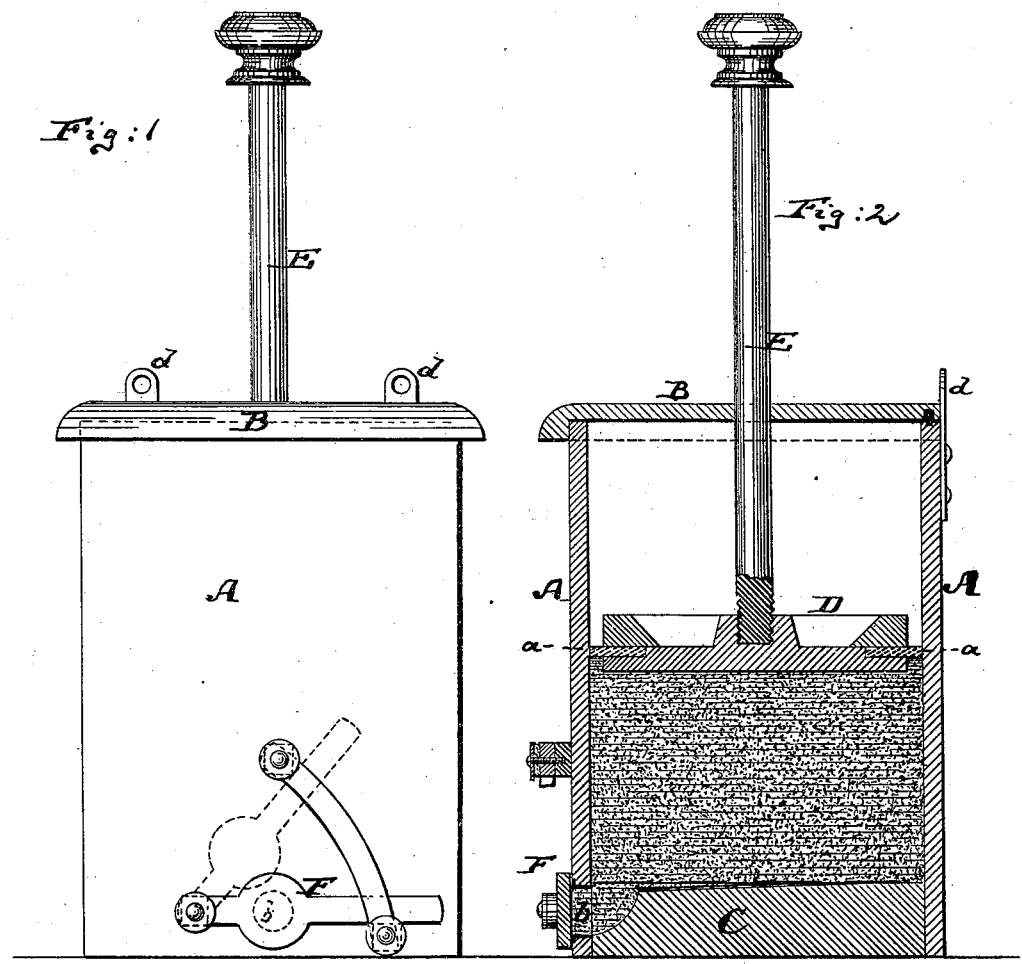
Witnesses:
John C. Trinbridge,
Willy H. C. Schultz.
Inventor:
Jacob Gulden
by his attorney
A. v. Briesen

UNITED STATES PATENT OFFICE.

JACOB GULDEN, OF NEW YORK, N. Y.

VESSEL FOR HOLDING AND DISPENSING MUSTARD.

SPECIFICATION forming part of Letters Patent No. 243,884, dated July 5, 1881.

Application filed February 4, 1881. (No model.)

*To all whom it may concern:*

Be it known that I, JACOB GULDEN, of New York, in the county and State of New York, have invented a new and Improved Vessel for Holding and Dispensing Mustard, of which the following is a specification.

Figure 1 is a front elevation, and Fig. 2 a central vertical section, of my improved vessel for holding and dispensing mustard.

Mustard contained in open vessels for table use, as is now usually the case, is apt to become badly contaminated by contact with the air. As heretofore constructed all mustard-vessels expose their contents to such contact with the air, and it therefore becomes necessary, at short intervals, to empty such vessels and cleanse them, and their contents are hardly ever completely consumed.

My invention seeks to produce a receptacle in which mustard will be kept from contact with the air for an indefinite period, and from which it can be discharged in portions whenever desired and in suitable quantities.

My invention consists in providing the mustard-holding vessel with a tight-fitting plunger which bears upon the contents and constitutes the cover for the same, serving also to discharge them from the vessel. The lower part of the vessel is provided with an opening which can be closed by a gate, and which, when open, allows the plunger to discharge the contents when moved downward.

Other details of improvement are hereinafter more fully specified.

In the accompanying drawings, the letter A represents a box of rectangular or other form, but invariably made with parallel upright walls.

B is the cover of this box, and C the bottom.

D is a plunger placed into the box from above and provided with an outwardly-projecting rubber edge-piece, $a$, which fits tight against the inner walls of the box, and prevents air from entering the lower part of the box around the plunger D. The said plunger D is attached to a stem, E, that extends through a hole in the cover B of the box. In the lower part of the box A is a discharge-opening, $b$, which can be closed by a gate, F, that is pivoted to the front of the box, as clearly shown in Fig. 1. When the mustard is to be put into the box A the cover B and plunger D are taken out, and the mustard is inserted. The plunger D is then put in so that it will rest on top of the mustard, and the cover B is next put in place.

The gate F is always kept closed unless mustard is to be taken from the box, in which case the gate is swung open, and the plunger slightly depressed, so as to eject some of the mustard (as much as may be desired) through the opening $b$, into a spoon or other suitable receptacle. As the contents are gradually withdrawn the plunger, of course, gradually assumes a lower position, and with its rubber edge $a$ wipes the walls of the box above the the mustard clean, preventing the unwholesome and unsightly accumulation of dried mustard in the empty part of the receptacle, which is one of the many objectionable features of the mustard receptacle now in use.

For use in kitchens I prefer to provide the box A with suspension loops or staples $d\ d$, as shown, so that the box can be hung from nails that are secured in the wall.

I claim—

The mustard-box A, having opening $b$ in its lower part, combined with the gate F, for closing said opening, and with the plunger D, having circumferential wiper $a$, and, with cover B, all arranged for operation substantially as herein shown and described.

JACOB GULDEN.

Witnesses:
WILLY G. E. SCHULTZ,
WILLIAM H. C. SMITH.